US011889247B2

(12) United States Patent
Holgersson et al.

(10) Patent No.: US 11,889,247 B2
(45) Date of Patent: Jan. 30, 2024

(54) TRANSCUTANEOUS BONE-ANCHORED HEARING AID WITH IMPROVED PACKAGING

(71) Applicant: Oticon Medical A/S, Smørum (DK)

(72) Inventors: Erik Holgersson, Askim (SE); Tomas Johansson, Askim (SE)

(73) Assignee: Oticon Medical A/S, Smørum (DK)

( * ) Notice: Subject to any disclaimer, the term of this patent is extended or adjusted under 35 U.S.C. 154(b) by 0 days.

(21) Appl. No.: 18/101,379

(22) Filed: Jan. 25, 2023

(65) Prior Publication Data

US 2023/0171554 A1 Jun. 1, 2023

Related U.S. Application Data

(63) Continuation of application No. 16/994,239, filed on Aug. 14, 2020, now Pat. No. 11,611,836.

(30) Foreign Application Priority Data

Aug. 15, 2019 (EP) ..................................... 19191935

(51) Int. Cl.
*H04R 25/00* (2006.01)
*H04R 9/02* (2006.01)

(52) U.S. Cl.
CPC ........... *H04R 25/606* (2013.01); *H04R 9/025* (2013.01); *H04R 25/554* (2013.01); *H04R 2460/13* (2013.01)

(58) Field of Classification Search
CPC ...... H04R 25/00; H04R 11/02; H04R 25/604; H04R 31/006; H04R 2460/13
See application file for complete search history.

(56) References Cited

U.S. PATENT DOCUMENTS

2007/0156011 A1 7/2007 Westerkull
2018/0184209 A1 6/2018 Zhu et al.

FOREIGN PATENT DOCUMENTS

EP 2 393 309 A1 7/2011
WO WO 2014/141193 A1 9/2014
WO WO2014141193 * 9/2014 ............ H04R 25/00

* cited by examiner

*Primary Examiner* — Amir H Etesam
(74) *Attorney, Agent, or Firm* — Birch, Stewart, Kolasch & Birch, LLP

(57) ABSTRACT

A transcutaneous bone-anchored hearing aid device for a recipient patient is described. The transcutaneous bone-anchored hearing aid device for a recipient patient comprising; a receiver coil for transcutaneous receiving of an externally generated communication signal; a signal processor configured for converting the externally generated communication signal into an electrical stimulation signal; an electromagnetic vibrator configured for receiving the electrical stimulation signal, and wherein the electromagnetic vibrator including; a coil unit configured to generate a dynamic magnetic flux based on the electrical stimulation signal; a permanent magnet configured to generate a static magnetic flux; a mass unit connected to the permanent magnet; a bobbin unit configured to engage with the coil unit, the permanent magnet, and the mass unit; a spring unit configured for maintaining an air gap below a moving mass, wherein the moving mass includes the coil unit, the permanent magnet, the mass unit and the bobbin unit, and where the moving mass and the spring unit is configured to generate an acoustical vibration; a vibrator plate configured to receive the acoustical vibration, and where the air gap is between the vibrator plate and a part of the moving mass, and wherein the mass unit has at least one insert configured to receive at least one of a group that includes at least a part of the permanent magnet, the coil unit, the vibrator plate and/or the spring unit.

20 Claims, 4 Drawing Sheets

TRANSCUTANEOUS BONE-ANCHORED HEARING AID WITH IMPROVED PACKAGING

This application is a Continuation of copending application Ser. No. 16/994,239, filed on Aug. 14, 2020, which claims priority under 35 U.S.C. § 119(a) to application Ser. No. 19/191,935.6, filed in Europe on Aug. 15, 2019, all of which are hereby expressly incorporated by reference into the present application.

FIELD

The present disclosure relates to an electromagnetic vibrator for a transcutaneous bone conduction hearing aid, which is configured to create perception of hearing to a user by transmitting sound vibrations through the bones of the user's head. More particularly, the disclosure relates to the electromagnetic vibrator (transducer) comprising an improved packaging of the features within the electromagnetic vibrator, where a mass unit of the electromagnetic vibrator includes an insert for receiving at least one of a group that includes a permanent magnet, a coil unit, a vibrator plate and/or a spring unit of the electromagnetic vibrator.

BACKGROUND

Hearing by bone conduction as a phenomenon, i.e., conduction of sound to the inner ear through the bones of the skull, is known. Electromagnetic vibrators combine properties such as small size, wide frequency range, and efficient energy transformation; hence, they are widely used in hearing aid applications. Such vibrators include a coil unit, a permanent magnet, a mass unit, a bobbin unit, a spring unit and a vibrator plate. By superimposing a signal magnetic flux generated by the coil unit wound around the bobbin unit (central portion) the force in an air gap, between the vibrator plate and bobbin unit, is produced.

A transcutaneous bone-anchored hearing aid device includes at least the electromagnetic vibrator which is implanted beneath the skin layers and fixated onto the skull of a user, and in most cases the electromagnetic vibrator is coupled to another housing including at least a receiver coil which is also implanted beneath the skin layers and fixated onto the skull of the user. The receiver coil may receive an external generated communication signal from an external device fixated onto the skin of the user with a magnetic force between a first magnet within the external device and a second magnet within the another housing.

In most cases, a groove is applied onto the skull of the user, and the electromagnetic vibrator is arranged within the groove for reducing the height from the top-surface of the skull and to the top-surface of the electromagnetic vibrator. The height reduction is needed for achieving a well adaptation of the skin layers about the electromagnetic vibrator and for creating an aesthetic implantation of the transcutaneous bone-anchored hearing aid device.

However, the bone-work needed for creating the groove in the skull is very time consuming and costly, and it implies a risk for the patient for obtaining different side-effects.

Different approaches have been done for minimizing the thickness of a vibrator in a transcutaneous bone anchored hearing aid device, and one approach is for example to replace the electromagnetic vibrator with a piezo-electric vibrator which makes it easier to make the vibrator more compact. However, a piezo-electric vibrator demands a relative higher voltage at the lower frequencies within the range of hearable frequencies than a conventional electromagnetic vibrator, but the piezo-electric vibrator is more efficient at the higher frequencies within the range of hearable frequencies.

Thus, the present disclosure teaches away to use a piezo-electric vibrator by teaching a novel and inventive approach of packaging the elements of a conventional electromagnetic vibrator for achieving a thinner electromagnetic vibrator which then results in no need of bone work when implanting the complete transcutaneous bone-anchored hearing aid device.

SUMMARY

An aspect of the disclosed invention is to provide a transcutaneous bone-anchored hearing aid device including an electromagnetic vibrator, where the electromagnetic vibrator is thinner than known state-of-art electromagnetic vibrator. By making the electromagnetic vibrator thinner it is possible to arrange the electromagnetic vibrator beneath the skin layers and onto the skull of a user without the need of making a groove in the skull for the electromagnetic vibrator. A further advantage is that the implanting of the transcutaneous bone-anchored hearing aid device would be easier, cheaper and less time consuming.

According to an aspect, a transcutaneous bone-anchored hearing aid device for a recipient patient comprising a receiver coil for transcutaneous receiving of an externally generated communication signal, a signal processor configured for converting the externally generated communication signal into an electrical stimulation signal, an electromagnetic vibrator configured for receiving the electrical stimulation signal. The externally generated communication signal may be transmitted by an external device which is arranged in vicinity to the transcutaneous bone-anchored hearing aid device and onto the skin of the user. The receiver coil may be arranged in a first housing, and the electromagnetic vibrator may be arranged in a second housing, where the first housing may be connected to the second housing via a connection element. The connection element may include one or more wires configured for transmitting control, audio and power signals between the receiver coil and the electromagnetic vibrator. The control, audio signal and/or power signals may be modulated into the externally generated communication signal by the external device.

The external device may include one or more microphones configured for receiving and converting an acoustical signal into an audio signal. The audio signal is then modulated into the externally generated communication signal by a processor in the external device and transmitted to the receiver coil of the transcutaneous bone-anchored hearing aid device.

The signal processor may be arranged within the first housing or the second housing. The signal processor may be divided into multiple signal sub-processors arranged in the first housing and/or the second housing. The sub-processors may include different features configured for performing different audio processing, such as fitting, improvement of audio quality, the conversion of the externally generated communication signal into an electrical stimulation signal, controlling or handling of commands and control signals from the external device.

The electromagnetic vibrator includes a coil unit configured to generate a dynamic magnetic flux based on the electrical stimulation signal, a permanent magnet configured to generate a static magnetic flux, a mass unit connected to the permanent magnet, a bobbin unit configured to engage with the coil unit, the permanent magnet, and the mass unit.

The electromagnetic vibrator includes a spring unit configured for maintaining an air gap below a moving mass, wherein the moving mass includes the coil unit, the permanent magnet, the mass unit and the bobbin unit, and where the moving mass and the spring unit is configured to generate an acoustical vibration.

The electromagnetic vibrator includes a vibrator plate configured to receive the acoustical vibration, and where the air gap is between the vibrator plate and a part of the moving mass, e.g. the bobbin unit.

The vibrator plate is arranged in such a manner that an air gap, extending across a longitudinal axis of the electromagnetic vibrator is provided between the vibrator plate and at least a portion or at least one permanent magnet. This means that the air gap has a lengthwise gap axis extending perpendicular to the longitudinal axis of the electromagnetic vibrator.

The mass unit has at least one insert configured to receive at least a part of at least one of a group that includes the permanent magnet, the coil unit, the vibrator plate and/or the spring unit.

The mass unit may also include multiple inserts for receiving at least a part of at least one of a group that includes the permanent magnet, the coil unit, the vibrator plate and/or the spring unit.

Normally, the spring unit and/or the vibrator plate are arranged beneath the mass unit and the bobbin unit, thereby, resulting in a total height of the electromagnetic vibrator which includes at least the height of the spring unit, the vibrator plate and the mass unit. However, by applying one or more inserts in the mass unit, makes it possible to arrange at least a part of the spring unit and the vibrator plate unit within the mass unit, thereby, resulting in a total height of the electromagnetic vibrator which includes at least the height of the mass unit and not the height of the spring unit and/or the vibrator plate. The reduction in height makes it then possible to avoid the bone work when implanting the transcutaneous bone-anchored hearing aid device.

Furthermore, the permanent magnet and the coil unit are arranged such that the mass unit perimeter the permanent magnet and the coil unit. By arranging at least a part of the permanent magnet and/or the coil unit within the insert of the mass unit makes it possible to reduce the width of the mass unit, and thereby, also the width of the electromagnetic vibrator.

The mass unit may be circular shaped, square shaped or any kind of a shape which includes an aperture or a hole of any kind of a shape. The aperture may be configured to receive the permanent magnet, the bobbin unit, and/or the coil unit.

The mass unit may have an outer surface directed radially or partially radially away from the permanent magnet and the coil unit and along a longitudinal axis of the electromagnetic vibrator. The mass unit may have an inner surface directed towards the permanent magnet, the bobbin unit and the coil unit. The insert or the one or more inserts may be provided in the inner surface of the mass unit, such that the opening of the insert is directed towards the permanent magnet, the bobbin unit, and the coil unit. The insert may receive at least a part of the at least one of the group that includes the permanent magnet, the coil unit, the vibrator plate and/or the spring unit, in such a way that the permanent magnet, the coil unit, the vibrator plate and/or the spring unit is arranged within the aperture of the mass unit.

The effect of the insert or the one or more inserts is a more compact electromagnetic vibrator.

The mass unit may circumference the bobbin unit, the permanent magnet and the coil unit, and the permanent magnet may circumference the coil unit and a part of the bobbin unit. Thereby, stacking of the permanent magnet, the coil unit and the mass unit is avoided, and the electromagnetic vibrator becomes more compact.

The electromagnetic vibrator may include a spring ring arranged beneath the spring unit, and wherein the spring ring is part of the group which includes the permanent magnet, the coil unit, the vibrator plate and/or the spring unit. The spring ring is a reinforcement of the spring unit. The spring unit may be arranged such that least a circumferential part of the spring unit is covered by the spring ring.

The electromagnetic vibrator may have a transverse axis along a first length of the electromagnetic vibrator and a longitudinal axis along a second length of the electromagnetic vibrator. The second length may be longer than the first length, and the transverse axis may be orthogonal to the longitudinal axis. The mass unit may have a mass height along the transverse axis. The coil unit may have a coil height along the transverse axis. The permanent magnet may have a magnet height along the transverse axis. The bobbin unit may have a bobbin height along the transverse axis. The coil height, the bobbin height and the magnet height are less than the height of the mass unit. The advantage of the height constraints to the above elements of the electromagnetic vibrator results in a more compact electromagnetic vibrator in respect to the width and thickness.

The permanent magnet may be arranged radially to the mass unit, and wherein the coil unit may be arranged radially to the permanent magnet.

The electromagnetic vibrator may have a bottom surface and an upper surface, where the upper surface may be partially parallel or fully parallel to the bottom surface, and wherein a distance between the upper surface and the bottom surface is less than the second length along the longitudinal axis. The transcutaneous bone-anchored hearing aid device comprises an interface unit configured for receiving the electrical stimulation signal, and wherein the interface unit is fully arranged between the upper surface and bottom surface.

By arranging the interface unit between the upper surface and the bottom surface would result in an unchanged thickness of the electromagnetic vibrator.

The interface unit may be applied on to the electromagnetic vibrator between the bottom surface and the upper surface.

The interface unit may be arranged within the electromagnetic vibrator to fit a cavity of the bobbin unit or the mass unit, or in an air gap between the upper surface and the bobbin unit.

The interface unit may include a demodulator unit configured to receive and demodulate the electrical stimulation signal and transmit the demodulated electrical stimulation signal to the coil unit, and wherein the coil unit may be configured to generate the dynamic magnetic flux based on the demodulated electrical stimulation signal. By arranging the demodulator unit within the interface unit the thickness of the electromagnetic vibrator would not increase.

The electromagnetic vibrator may include a demodulator unit configured to receive and demodulate the electrical stimulation signal and transmit the demodulated electrical stimulation signal to the coil unit, and wherein the coil unit may be configured to generate the dynamic magnetic flux based on the demodulated electrical stimulation signal, wherein the demodulator unit may be arranged to fit in a cavity of the bobbin unit or the mass unit, or the demodulator unit may be arrange in an air-gap between the bobbin unit and the upper surface. By arranging the demodulator unit within the cavity or the air-gap between the bobbin unit and the upper surface would result in an unchanged thickness of electromagnetic vibrator.

The demodulator unit may be wired connected to the interface unit, and where the wired connection is guided by a guiding path in the mass unit. The guiding path being either a groove or a hole in the mass unit results in no need of applying extra space within the electromagnetic vibrator for the wiring.

The guiding part may be a guiding hole going through the mass unit or a guiding groove applied to a surface of the mass unit.

The guiding groove or the guiding path being a groove may have a larger depth along a transverse axis extending from the bottom surface to the upper surface than the insert in the mass unit. The reason for this is that the thickness of the wire forming part of the wired connection is larger than the thickness of the vibrator plate and/or the spring unit.

The shape of the insert in the mass unit is circular in a plane being parallel to the longitudinal axis of the electromagnetic vibrator.

The shape of the guiding groove or the guiding path is not circular in the plane being parallel to the longitudinal axis of the electromagnetic vibrator.

The vibrator plate may include a first plate insert configured to receive the spring ring. The compactness of the electromagnetic vibrator is further improved, because the spring ring may be arranged in the insert of the mass unit, and in another example the spring may be arranged within the insert of the mass unit and in the first plate insert of the vibrator plate. Thereby, the arrangement of the mass unit, the spring unit, the spring ring and the vibrator plate can be more compressed.

The electromagnetic vibrator may include a vibrator plate ring between the spring unit and the vibrator plate, wherein the vibrator plate includes a second plate insert configured to receive at least a part of the vibrator plate ring and/or the spring ring. The second plate insert may be arranged on a circumferential part of the vibrator plate, or the second plate insert may be arranged on a circumferential part of the first plate insert, where the first plate insert may be arranged on a circumferential part of the vibrator plate.

The first plate insert and the second plate insert may be form at a circumferential edge of the vibrator plate. The first plate insert and the second plate insert may be arranged such that the circumferential edge of the vibrator plate has one or more step levels.

The mass unit includes a second insert configured to receive at least a part of the permanent magnet, the coil unit and/or at least a part of the bobbin unit.

The bobbin unit and the vibrator plate may be mode of a soft magnetic material.

According to another aspect, an electromagnetic vibrator is disclosed. The electromagnetic vibrator includes

- a magnet arrangement comprising a central portion, a coil wound around the central portion and being configured to generate a dynamic magnetic field and at least one permanent magnet configured to generate a static magnetic field;
- a vibrator plate arranged in position and in such a manner that a gap, extending across a longitudinal axis of the electromagnetic vibrator is provided between the vibrator plate and at least one of said central portion or at least one permanent magnet; and
- an encasing surrounding at least a portion of the magnet arrangement, wherein the magnet arrangement comprises a bobbin unit and encasing comprise a gap adjustment mechanism that is configured to move the bobbin unit relative to the encasing for adjusting the gap between the vibrator plate and at least one of said central portion or at least one permanent magnet, and/or between an upper surface of the electromagnetic vibrator and the bobbin unit.

Hereby, it is possible to provide a very precise adjustment of the gap. Furthermore, the gap can be increased or decreased the gap in a simple manner. The gap may be referred to as an air gap.

The magnet arrangement comprises a central portion and a coil wound around the central portion. Accordingly, the coil is arranged and configured to generate a dynamic magnetic flux. The magnet arrangement moreover comprises at least one permanent magnet configured to generate a static magnetic field.

The electromagnetic vibrator also comprises a vibrator plate. The vibrator plate is arranged in position and in such a manner that a gap, extending across a longitudinal axis of the electromagnetic vibrator is provided between the vibrator plate and at least one of said central portion or at least one permanent magnet. the central portion. This means that the gap has a lengthwise gap axis extending perpendicular to the longitudinal axis of the electromagnetic vibrator.

The longitudinal axis of the electromagnetic vibrator may be defined as the axis that extends along a distance from one end of the bobbin unit towards a coupling to the bone of the user wearing the hearing aid device.

The longitudinal axis of the electromagnetic vibrator may also be defined as the axis along which the counterweight vibrates or moves.

The longitudinal axis of the electromagnetic vibrator may also be defined as the axis extending in parallel with a longitudinal length of the central portion of which the coil is wound around, wherein the longitudinal length of the central portion defines a length which is larger than a transverse length of the central portion.

The longitudinal axis of the electromagnetic vibrator may also be defined as the axis being parallel or substantially parallel to the skin of the user when the electromagnetic vibrator is worn by the user.

The electromagnetic vibrator also comprises an encasing surrounding at least a portion of the magnet arrangement, wherein the magnet arrangement comprises a bobbin unit being moveably arranged, using the gap adjustment mechanism, relative to the encasing.

The magnet arrangement includes the bobbin unit comprising the central portion, the coil, and at least one permanent magnet.

In an embodiment where the coil and permanent magnet are attached to the bobbin unit, it is apparent that when the gap is increased or decreased, the bobbin unit as well as the coil and permanent magnet are moved.

In one embodiment, the bobbin unit includes a first adjustment part and the encasing includes a second adjustment part, wherein the first adjustment part and the second adjustment part are configured to co-operate with each other to adjust the gap.

According to another aspect of the disclosure, the encasing is a counterweight assembly, and the adjustment mechanism is configured to move the counterweight assembly and the bobbin unit relative to one another along the longitudinal axis of the electromagnetic vibrator.

In one embodiment, the adjustment mechanism comprises a first part and a second part, wherein the first part and the second part are engagingly arranged relative to each other, wherein the configuration of the first part and the second part relative to each other determines the size of the gap. Accordingly, by changing the configuration of the first part and the second part relative to each other determines the size of the gap.

In an embodiment according to the disclosure, the first part comprises a first threaded portion and the second part comprises a second corresponding engagingly threaded portion. Hereby, it is possible to provide an accurate adjustment of the gap by rotating the first part relative to the second part. Rotation may be achieved by applying a clockwise or anti-clockwise directed torque.

In an embodiment according to the disclosure, the encasing includes a protruding portion and the bobbin unit includes a corresponding receiving portion adapted to engagingly receive said protruding portion. The protruding portion may be formed as an elongated body (e.g. a pin) configured to be received by a corresponding (e.g. L-shaped slot) female receptor, wherein the protruding portion and the female receptor together constitute bayonet-type connection.

In one embodiment according to the disclosure, the bobbin unit and the encasing are moveably attached to each other by means of one or more connections utilizing bayonet principle.

In a further embodiment according to the disclosure, the bobbin unit includes a protruding portion and the encasing includes a corresponding receiving portion adapted to engagingly receive said protruding portion.

In an even further embodiment according to the disclosure, the encasing and the vibrator plate are directly or indirectly connected using a mechanical spring, thus maintaining the airgap between the magnet arrangement and vibrator plate.

In one embodiment according to the disclosure, the bobbin unit and the encasing are moveably attached to each other by means of a number of corresponding female members and movably arranged male members provided in the bobbin unit and the encasing, respectively.

In another embodiment according to the disclosure, the bobbin unit comprises an annular groove surrounding the central portion, wherein the coil is arranged in the groove.

In a further embodiment according to the disclosure, the at least one permanent magnet is formed as an annular disc arranged in a position, in which the permanent magnet extends along an end portion of the bobbin unit. Accordingly, it is possible to ease the assembling of the electromagnetic vibrator.

In a preferred embodiment according to the disclosure, the permanent magnet comprises a plurality of separate segments joined together to form an annular ring magnet. Hereby, it is possible to reduce the reluctance of the vibrator by providing a magnet that is thinner than available in the prior art. Prior art permanent for electromagnetic vibrator are difficult to make thin without risking the magnet becoming very fragile. Therefore, having an annular ring magnet comprising a plurality of separate segment joined together allow for making a thinner magnet, thus reducing reluctance in the magnetic circuit without compromising on the strength of the annular ring magnet.

It may be preferred that the plurality of separate segments have equal geometry.

In an embodiment, the permanent magnet comprises at least two segments joined together to form the annular ring magnet.

In the prior art electromagnetic vibrators, the dynamic magnetic field created by the coil passes through the same magnetic circuit as the static field created by the permanent magnet. In order to achieve the highest possible efficiency (the highest force output for a given power input) of the magnetic circuit, the reluctance (magnetic resistance) of the magnetic circuit must be minimised. The reluctance is given by the following equation:

$$R = \frac{L}{\mu_0 \mu_r A} \tag{1}$$

Where L is the length of the circuit, A is the cross-sectional area of the circuit, to is the permeability of vacuum, $\mu_r$ is the relative magnetic permeability of the material.

In magnetic conductive materials $\mu_r$ is typically in the range of 10000-20000 H/m. In air and in the magnet, $\mu_r$ is 1. The magnet is typically rather thick (about 1 mm) compared to the inner and outer air gap (which is about 60-150 μm). The total reluctance is given by the sum of the of reluctances of the components constituting the total circuit the magnet is a large contributor to the total reluctance. Therefore, to lower the reluctance of the vibrator it is desirably to make the magnet thin. However, a thin magnet will become fragile and can easily break.

In an embodiment according to the disclosure, the permanent magnet comprises at least three segments. In a preferred embodiment according to the disclosure, the permanent magnet comprises four segments.

In an embodiment according to the disclosure, the bobbin unit is rotatably attached to the encasing. It may be an advantage that bobbin unit is rotatably attached to the encasing by means of a coupling mechanism that causes the bobbin unit to be axially displaced relative to the encasing upon being rotated. Hereby, it is possible to provide a very precise adjustment of the gap in a simple manner.

In one embodiment according to the disclosure, the bobbin unit comprises a first adjustment part formed as an outer periphery provided with a threaded portion provided at an outer periphery of the bobbin unit, wherein the bobbin unit comprises a second adjustment part formed as a corresponding threaded portion provided at the inner side of the encasing engaging with the threaded portion provided at an outer periphery of the bobbin unit a corresponding threaded portion provided at the inner side of the encasing.

In an embodiment, the gap adjustment mechanism includes a first adjustment part, provided at an outer periphery of the bobbin unit, the first adjustment part includes one of at least one protruding portion or a plurality of receiving sections. The mechanism further includes a second adjustment part, provided at an inner side of the encasing, the second adjustment part comprising another of a plurality of corresponding receiving sections that is configured to operationally cooperate with the at least one protruding portion of the first adjustment part or at least one corresponding protruding portion that is configured to operationally cooperate with the plurality of receiving sections of the first adjustment part.

Hereby, it is possible to turn the bobbin unit to increase or decrease the gap between the central portion of the bobbin unit and the vibrator plate.

In one embodiment according to the disclosure, the number of segments in the plurality of separate segments is inversely related to the height (thickness) of the permanent magnet. This means that a larger number of separate segments are applied when the height of the permanent magnet is large than when the height of the permanent magnet is smaller.

In one embodiment according to the disclosure, the inverse relationship between number of segments in the plurality of separate segments with respect to the height is defined in such a manner that the when the height is reduced by two times the number of segments is increased by four times.

In a preferred embodiment according to the disclosure, the permanent magnet comprises four separate segments joined together to form an annular ring magnet, wherein the height of the segments is 0.2-0.8 mm, preferably 0.4-0.6 mm, such as 0.5 mm.

In another embodiment according to the disclosure, the inverse relationship between number of segments in the plurality of separate segments with respect to the height is defined in such a manner that the when the height is reduced by two times the number of segments is increased by three times.

In a further embodiment according to the disclosure, the inverse relationship between number of segments in the plurality of separate segments with respect to the height is defined in such a manner that the when the height is reduced by two times the number of segments is increased by five times.

In an even further embodiment according to the disclosure, the number of segments in the plurality of separate segments depend upon the mechanical strength of the segments of the plurality of segments. It is preferred that a larger number of segments are applied when the mechanical strength is low, whereas a smaller number of segments are applied when the mechanical strength is higher. The mechanical strength means its ability to withstand an applied load without failure or plastic deformation. In one embodiment according to the disclosure, the mechanical strength is the yield strength of the segments. In another embodiment according to the disclosure, the mechanical strength is the compressive strength of the segments. In a further embodiment according to the disclosure, the mechanical strength is the tensile strength of the segments.

In an even further embodiment according to the disclosure, the gap between the central portion of the magnet arrangement and the vibrator plate is smaller than the gap between the at least one permanent magnet and the vibrator plate. It may be preferred that the gap between the central portion of the magnet arrangement and the vibrator plate is in the range 20-100 μm, such as 40-80 μm preferably approximately 60 μm, wherein the gap between the at least one permanent magnet and the vibrator plate is in the range 100-200 μm, such as 120-180 μm preferably approximately 150 μm.

In one embodiment according to the disclosure, a gap is provided between the at least one permanent magnet and the encasing. Hereby, it is possible to rotate the bobbin unit relative to the encasing.

In another embodiment according to the disclosure, the electromagnetic vibrator is symmetric with respect to the longitudinal axis of the electromagnetic vibrator.

In a further embodiment according to the disclosure, the gap adjustment mechanism comprises a first adjustment part comprising at least one of:

at least one protruding portion or a plurality of receiving sections, wherein the gap adjustment mechanism comprises a second adjustment part comprising:

the at least one corresponding protruding portion or a plurality of corresponding receiving sections.

The first adjustment part may comprise one or more protruding portions, whereas the second adjustment part comprises a plurality of corresponding receiving sections.

The first adjustment part may comprise a plurality of receiving sections, whereas the second adjustment part comprises one or more corresponding protruding portions.

In an embodiment according to the disclosure, the first adjustment part and/or the second adjustment part forms the adjustment mechanism utilizing bayonet mount principle. This means that the first adjustment part and/or the second adjustment part constitute structures of a bayonet mount. It may be preferred that both the first adjustment part and the second adjustment part constitute structures of a bayonet mount.

In another embodiment according to the disclosure, the first adjustment part and/or the second adjustment forms the adjustment mechanism utilizing the ratchet principle. This means that the first adjustment part and/or the second adjustment part constitute structures of a ratchet mount (a mechanical device that allows continuous linear or rotary motion in only one direction while preventing motion in the opposite direction). It may be preferred that both the first adjustment part and the second adjustment part constitute structures of a ratchet.

In a further embodiment according to the disclosure, the pitch of the threads of the at least one threaded portion:

a) provided at an outer periphery of the bobbin unit and the threaded portion provided at the inner side of the encasing;
b) provided at the receiving section of bayonet mount or
c) provided at the receiving section of a ratchet mount, is selected to achieve a predefined revolution specific change of the gap between the vibrator plate and the central portion.

The pitch of a thread is the distance, measured parallel to its axis, between corresponding points on adjacent surfaces, in the same axial plane.

In one embodiment according to the disclosure, the threads are shaped in such a manner that the gap between the vibrator plate and the central portion is changed approximately 50 μm per revolution.

In another embodiment according to the disclosure, the threads are shaped in such a manner that the gap between the vibrator plate and the central portion is changed a predefined distance expressed in lam per revolution.

In one aspect of the disclosure, a bone conduction hearing aid comprises an electromagnetic vibrator according to the disclosure.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

DETAILED DESCRIPTION

Figure 1A:
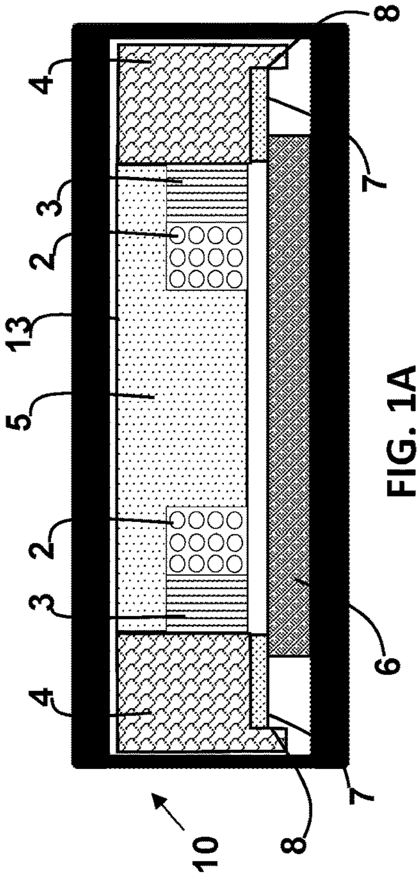
FIGS. 1A to 1E illustrates differ examples of an electromagnetic vibrator.

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, etc. (collectively referred to as "elements"). Depending upon particular application, design constraints or other reasons, these elements may be implemented using other equivalent elements.

The hearing aid that is adapted to improve or augment the hearing capability of a user by receiving an acoustic signal from a user's surroundings, generating a corresponding audio signal, possibly modifying the audio signal and providing the possibly modified audio signal as an audible signal to at least one of the user's ears. Such audible signals may be provided in the form of an acoustic signal transferred as mechanical vibrations to the user's inner ears through bone structure of the user's head.

The hearing aid is adapted to be worn in any known way. This may include arranging a unit of the hearing aid attached to a fixture implanted into the skull bone such as in a Bone Anchored Hearing Aid or at least a part of the hearing aid may be an implanted part.

A "hearing system" refers to a system comprising one or two hearing aids, and a "binaural hearing system" refers to a system comprising two hearing aids where the devices are adapted to cooperatively provide audible signals to both of the user's ears or the hearing aid of bone conduction type may be part of a bimodal system comprising a cochlear implant and a bone conduction hearing aid. The system may further include auxiliary device(s) that communicates with at least one hearing aid, the auxiliary device affecting the operation of the hearing aids and/or benefitting from the functioning of the hearing aids. A wired or wireless communication link between the at least one hearing aid and the auxiliary device is established that allows for exchanging information (e.g. control and status signals, possibly audio signals) between the at least one hearing aid and the auxiliary device. Such auxiliary devices may include at least one of remote controls, remote microphones, audio gateway devices, mobile phones, public-address systems, car audio systems or music players or a combination thereof. The audio gateway is adapted to receive a multitude of audio signals such as from an entertainment device like a TV or a music player, a telephone apparatus like a mobile telephone or a computer, a PC. The audio gateway is further adapted to select and/or combine an appropriate one of the received audio signals (or combination of signals) for transmission to the at least one hearing aid. The remote control is adapted to control functionality and operation of the at least one hearing aids. The function of the remote control may be implemented in a SmartPhone or other electronic device, the SmartPhone/electronic device possibly running an application that controls functionality of the at least one hearing aid.

In general, a hearing aid includes i) an input unit such as a microphone for receiving an acoustic signal from a user's surroundings and providing a corresponding input audio signal, and/or ii) a receiving unit for electronically receiving an input audio signal. The hearing aid further includes a signal processing unit for processing the input audio signal and an output unit for providing an audible signal to the user in dependence on the processed audio signal.

The input unit may include multiple input microphones, e.g. for providing direction-dependent audio signal processing. Such directional microphone system is adapted to enhance a target acoustic source among a multitude of acoustic sources in the user's environment. In one aspect, the directional system is adapted to detect (such as adaptively detect) from which direction a particular part of the microphone signal originates. This may be achieved by using conventionally known methods. The signal processing unit may include amplifier that is adapted to apply a frequency dependent gain to the input audio signal. The signal processing unit may further be adapted to provide other relevant functionality such as compression, noise reduction, etc. The output unit may include an output transducer for providing mechanical vibrations either transcutaneously or percutaneously to the skull bone.

Figure 1B:
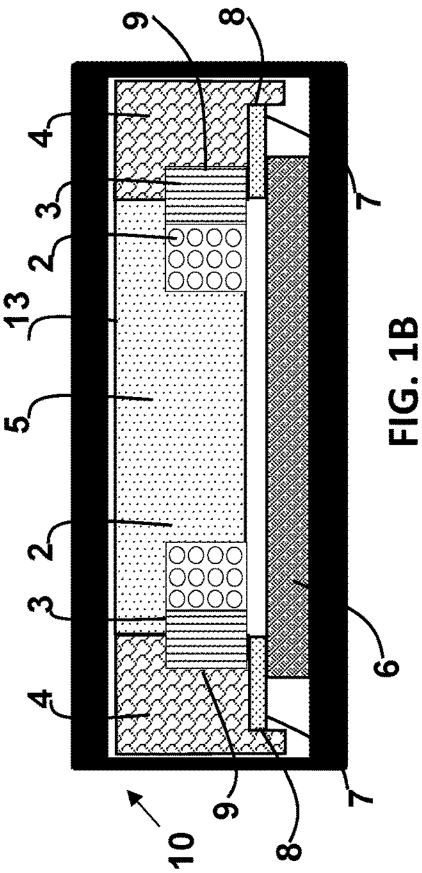
Figure 1C:
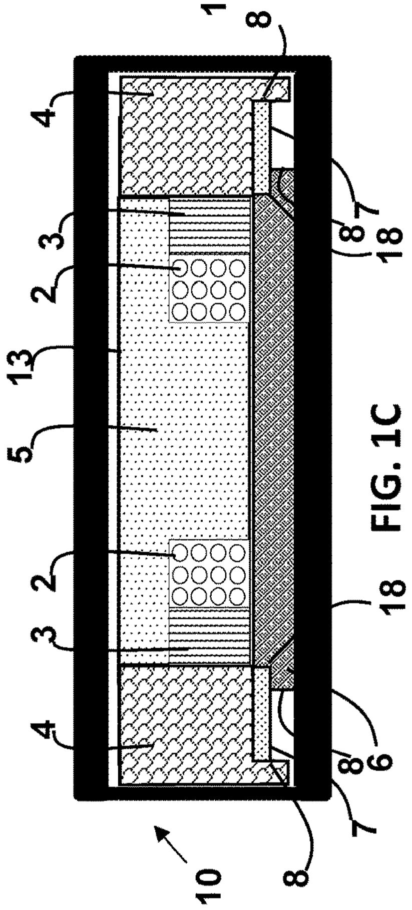
Figure 1D:
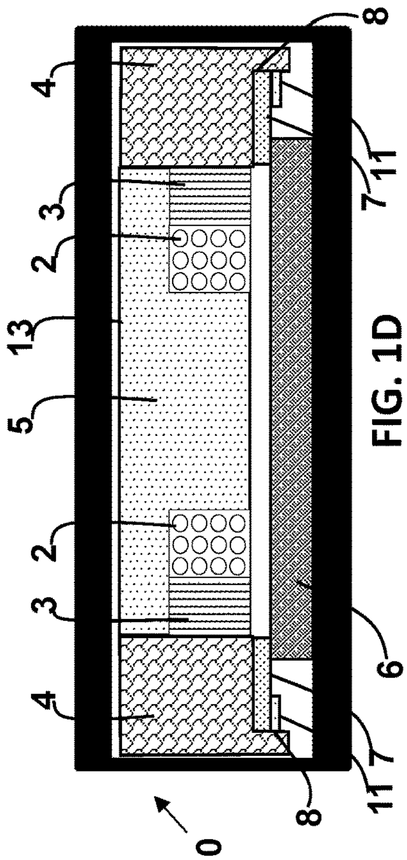
Figure 1E:
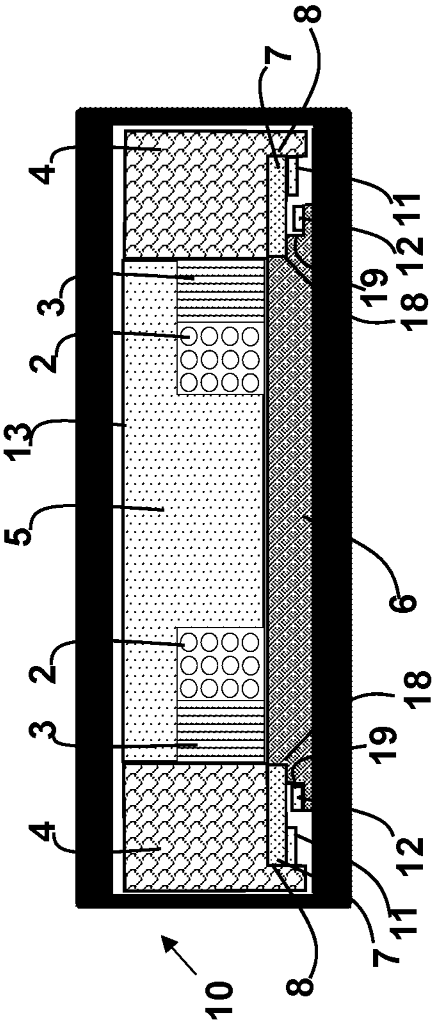

Now referring to FIGS. 1A to 1E, different examples of an electromagnetic vibrator 10 are seen. The figures illustrate a cross-section of the electromagnetic vibrator 10, wherein the electromagnetic vibrator 10 includes a coil unit 2 and a permanent magnet 3. The coil unit 2 and the permanent magnet 3 may be glued together. Furthermore, the electromagnetic vibrator 10 includes a mass unit 4. The permanent magnet 3 may be glued together with the mass unit 4. The electromagnetic vibrator 10 includes a bobbin unit 5 which is arranged in the mass unit 4. The mass unit 4 may be of any shape which includes an aperture 13 configured to receive at least the bobbin unit 5, the permanent magnet 3 and the coil unit 2. The electromagnetic vibrator 10 includes a spring unit 7 arranged between a vibrator plate 6 and the bobbin unit 5. The spring unit 7 maintains an air gap between the vibrator plate 6 and the bobbin unit 5. Additionally, the spring unit 7 is received by an insert 8 provided into the mass unit 4. In FIG. 1A, at least a part of the spring unit 7 and at least a part of the vibrator plate are arranged within the insert 8. In FIG. 1B, the mass unit 4 includes a second insert 9, which in this example is configured to receive at least a part of the permanent magnet 3. In another example, the second insert 9 may receive the full permanent magnet 3 and at least a part of the coil unit 2. Yet, in another example, the bobbin unit may be received by the second insert 9 or by a third insert (not shown) in the mass unit 4. In FIG. 1C, the vibrator plate 6 includes a first plate insert 18 configured for receiving the spring unit 7. In this example, the first plate insert 9 is arranged on a circumferential part of the vibrator plate. In FIG. 1D, a spring ring 11 is arranged beneath the spring unit 7, and wherein at least a part of the spring ring 11 is arranged within the insert 8. In FIG. 1E, the vibrator plate 6 includes a second plate insert 19 arranged on the circumferential part of the vibrator plate 6 or the first plate insert 18. Furthermore, the electromagnetic vibrator 10 includes a vibrator plate ring 12 arranged within the second plate insert 19.

Figure 2:
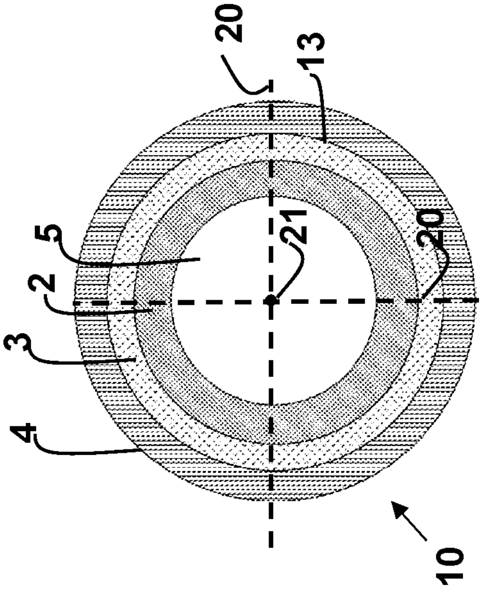
FIG. 2 illustrates a top-view of the electromagnetic vibrator.

FIG. 2 illustrates a top-view of the electromagnetic vibrator 10. In the figure, the mass unit 4 includes an aperture 13 configured to receive the permanent magnet 3, the bobbin unit 5, and the coil unit 2. The mass unit 4 circumference the bobbin unit 5, the permanent magnet 3, and the coil unit 2. The permanent magnet 3 circumference the coil unit 2 and a part of the bobbin unit 5.

The permanent magnet 3 is arranged radially to the mass unit 4, and wherein the coil unit 2 is arranged radially to the permanent magnet 3. In this example, the mass unit 4, the permanent magnet 3, the bobbin unit 5 and the coil unit 2 are circular shaped, however, other shapes would also be suitable.

Furthermore, FIG. 2 illustrates a top view of the electromagnetic vibrator 10 having a transverse axis 21 and a longitudinal axis 20.

Figure 3:
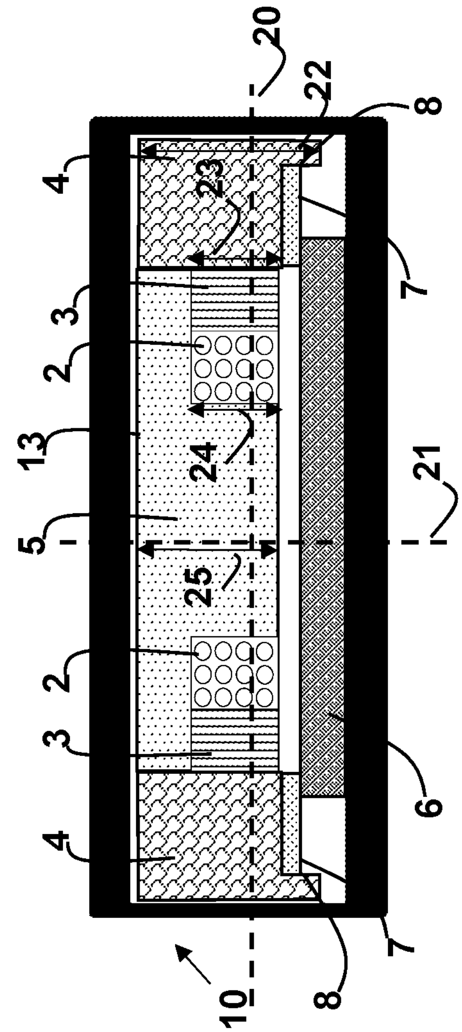
FIG. 3 illustrate a cross-section of the electromagnetic vibrator.

FIG. 3 illustrate a cross-section of the electromagnetic vibrator 10 having the transverse axis 21 along a first length of the electromagnetic vibrator 10 and the longitudinal axis 20 along a second length of the electromagnetic vibrator 10, and wherein the second length is longer than the first length, and the transverse axis 21 is orthogonal to the longitudinal axis 20. Furthermore, the figure illustrates that the mass unit has a mass height 22 along the transverse axis 21, and that the coil unit 2 has a coil height 24 along the transverse axis 21. Additionally, the figure illustrates that the permanent magnet 3 has a magnet height 23 along the transverse axis 21, and that the bobbin unit 5 has a bobbin height 25 along the transverse axis 21. In this example, the coil height, the bobbin height and the magnet height are less than the mass height.

Figure 4B:
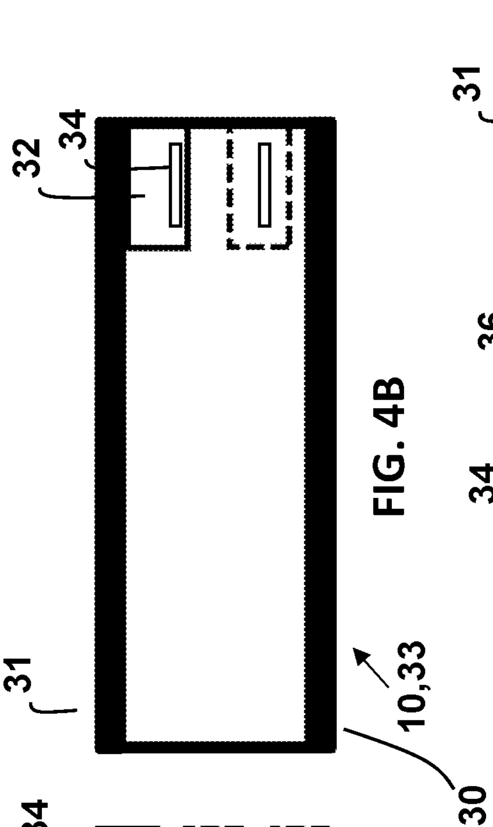
FIGS. 4A to 4D illustrate different examples of the electromagnetic vibrator.
Figure 4D:
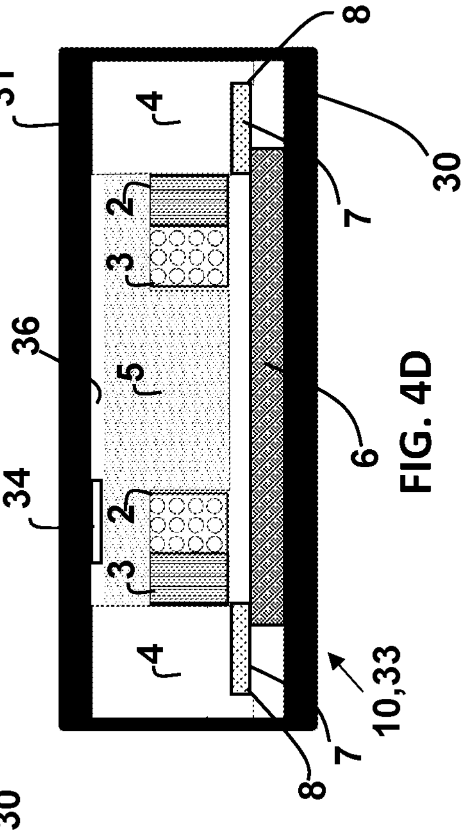
Figure 4A:
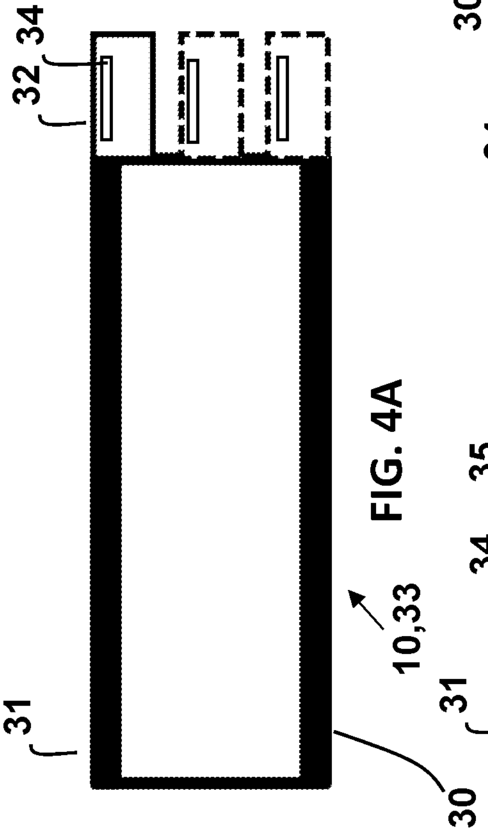

FIGS. 4A to 4D illustrate different examples of the electromagnetic vibrator 10. The figures illustrate a cross-section of the electromagnetic vibrator 10. In FIGS. 4A to 4B, the electromagnetic vibrator 10 has a bottom surface 30 and an upper surface 31, where the upper surface 31 is partially or fully parallel to the bottom surface 30, and wherein a distance between the upper surface 31 and the bottom surface 30 is less than the second length, and wherein the electromagnetic vibrator 10 comprises an interface unit 32 configured for receiving the electrical stimulation signal, and wherein the interface unit 32 is fully arranged between the upper surface and bottom surface. The interface unit 32 includes connectors configured to be connected with wires that are connected to a receiver coil 40, wherein the receiver coil 40 is configured for transcutaneously and inductively receiving an externally generated communication signal from an external device. Optionally, the interface unit 32 may include a demodulator unit 34 configured to receive and demodulate the electrical stimulation signal and transmit the demodulated electrical stimulation signal to the coil unit 2, and wherein the coil unit 2 is configured to generate the dynamic magnetic flux based on the demodulated electrical stimulation signal. In FIG. 4A, the interface unit 32 is arranged fully or partly outside a housing 33 of the electromagnetic vibrator 10. In this example, the interface unit 32 is attached to an outer surface of the housing 33 of the electromagnetic vibrator 10 and between the upper surface 31 and the bottom surface 30. In FIG. 4B, the interface unit 32 is arranged within the housing 33 of the electromagnetic vibrator 10 and between the upper surface 31 and the bottom surface 30.

Figure 4C:
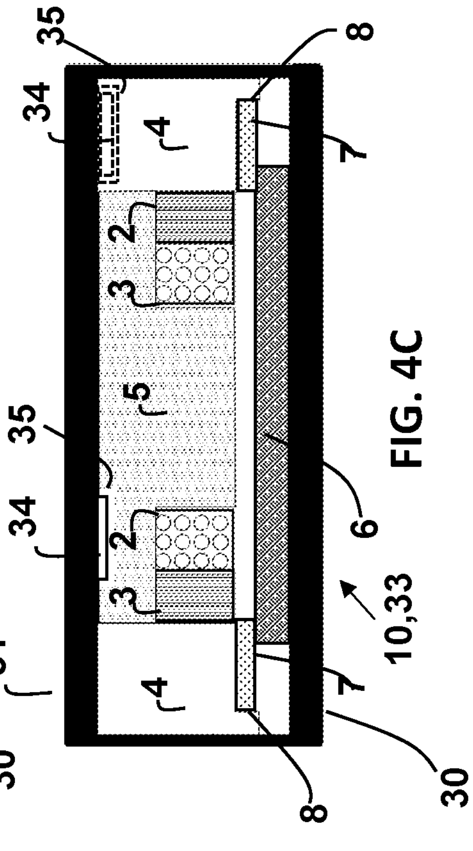

FIGS. 4C and 4D illustrate different examples on how to arrange the demodulator unit 34 within the housing 33 of the electromagnetic vibrator 10. The demodulator unit 34 is configured to receive and demodulate the electrical stimulation signal and transmit the demodulated electrical stimulation signal to the coil unit 2. In FIG. 4C, two different examples of how to arrange the demodulator unit 34 is seen. In one example, the demodulator unit 34 is arranged within the housing 33 of the electromagnetic vibrator 10 such that it fits into a cavity 35 of the bobbin unit 5. The demodulator unit 34 is attached to the upper surface 31 of the electromagnetic vibrator 10, and when the bobbin unit 5 starts to vibrate then no collision will appear between the bobbin unit 5 and the demodulator unit 34. In another example, the demodulator unit 34 is arranged such that it first into a cavity 35 of the mass unit 4. In FIG. 4D, the demodulator unit 34 is arrange in an air-gap 36 between the bobbin unit 4 and the upper surface 31.

Figure 5:
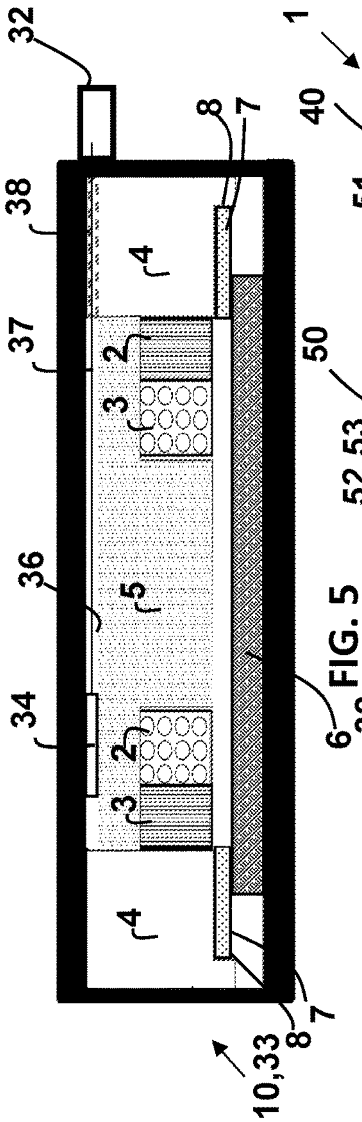
FIG. 5 illustrates an electromagnetic vibrator.

FIG. 5 illustrates the electromagnetic vibrator 10 wherein the demodulator unit 34 is arranged within the housing 33 of the electromagnetic vibrator 10. The demodulator 34 unit is wired 37 connected to the interface unit 32, and where the wired 37 connection is guided by a guiding path 38 in the mass unit 4. The guiding part 38 may be a guiding hole going through the mass unit or a guiding groove applied to a surface of the mass unit 4. The wired 37 connection could include flexible PCB.

Figure 6A:
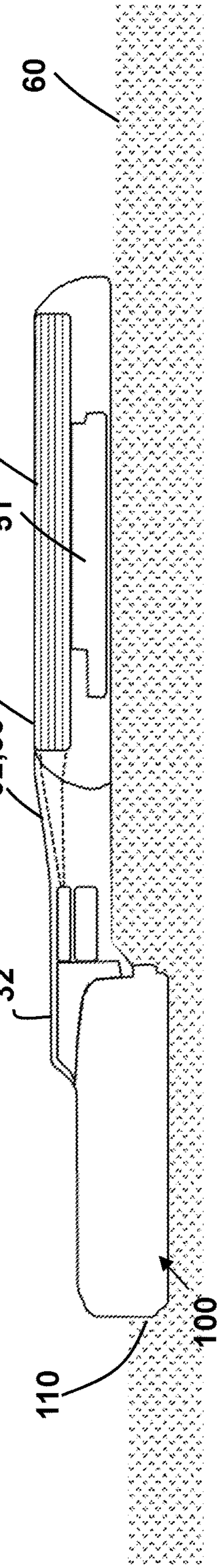
FIGS. 6A and 6B illustrate a transcutaneous bone-anchored hearing aid device implanted into a skull of a recipient patient.
Figure 6B:
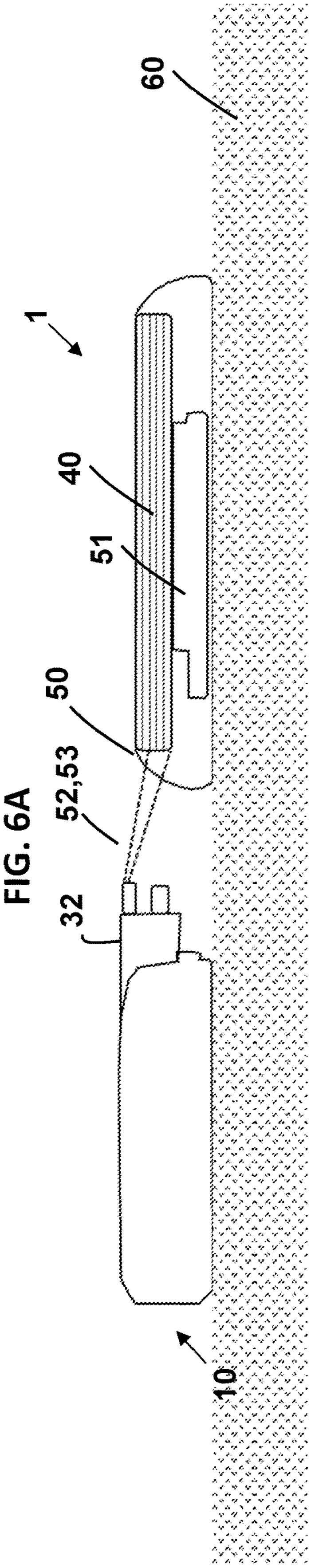

FIGS. 6A and 6B illustrate the transcutaneous bone-anchored hearing aid device 1 implanted into a skull 60 of a recipient patient. In these examples, the transcutaneous bone-anchored hearing aid device 1 includes a receiver coil 40 arranged within a first housing 50. The first housing 50 includes a magnet 51 configured to align with a second magnet of an external device such that a transmitter coil of the external device is optimal aligned with the receiver coil 40. In one example, the magnet 51 may be contained by a titanium housing which is arranged within the first housing 50. The receiver coil 40 is then connected to the interface unit 32 via a connection element 52 including multiple wires 53. In FIG. 6A, the transcutaneous bone-anchored hearing aid device 1 includes a second housing 100 including a conventional electromagnetic vibrator, wherein furthermore, an interface unit 32 is not arranged between an upper and a bottom surface of the second housing 100. Thereby, bone work is needed for making a groove 100 where the conventional electromagnetic vibrator 100 is to be inserted and fixated onto the skull 60. In FIG. 6B, the transcutaneous bone-anchored hearing aid device 1 includes the electromagnetic vibrator 10 as described in the previous figures, and in this example, it is seen that no bone work is needed because of the reduce thickness of the electromagnetic vibrator 10 in view of the conventional electromagnetic vibrator 100.

The first housing and/or the second housing may be made of silicone.

As used, the singular forms “a,” “an,” and “the” are intended to include the plural forms as well (i.e. to have the meaning “at least one”), unless expressly stated otherwise. It will be further understood that the terms “includes,” “comprises,” “including,” and/or “comprising,” when used in this specification, specify the presence of stated features, elements, components, and/or steps but do not preclude the presence or addition of one or more other features, elements, components, and/or steps thereof. It will also be understood that when an element is referred to as being “connected” or “coupled” to another element, it can be directly connected or coupled to the other element, but an intervening element may also be present, unless expressly stated otherwise. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The scope should be judged in terms of the claims that follow.

The invention claimed is:

1. A transcutaneous bone-anchored hearing aid device for a recipient patient comprising:
- a receiver coil for transcutaneous receiving of an externally generated communication signal;
- a signal processor configured for converting the externally generated communication signal into an electrical stimulation signal, and
- an electromagnetic vibrator configured for receiving the electrical stimulation signal, the electromagnetic vibrator including a housing in which is housed:
  - a coil unit configured to generate a dynamic magnetic flux based on the electrical stimulation signal,
  - a permanent magnet configured to generate a static magnetic flux,
  - a mass unit connected to the permanent magnet,
  - a bobbin unit configured to engage with the coil unit, the permanent magnet, and the mass unit,
  - a spring unit configured for maintaining an air gap below a moving mass, wherein the moving mass includes the coil unit, the permanent magnet, the mass unit and the bobbin unit, and where the moving mass and the spring unit are configured to generate an acoustical vibration,
  - a vibrator plate configured to receive the acoustical vibration, and where the air gap is between the vibrator plate and a part of the moving mass.

2. A transcutaneous bone-anchored hearing aid device according to claim 1, where the mass unit includes an aperture configured to receive the permanent magnet, the bobbin unit, and the coil unit.

3. A transcutaneous bone-anchored hearing aid device according to claim 1, wherein the electromagnetic vibrator includes a spring ring arranged beneath the spring unit.

4. A transcutaneous bone-anchored hearing aid device according to claim 1,
- wherein the electromagnetic vibrator has a transverse axis along a first length of the electromagnetic vibrator and a longitudinal axis along a second length of the electromagnetic vibrator,
- wherein the second length is longer than the first length, and the transverse axis is orthogonal to the longitudinal axis, and
- wherein:
  - the mass unit has a mass height along the transverse axis,
  - the coil unit has a coil height along the transverse axis,
  - the permanent magnet has a magnet height along the transverse axis,
  - the bobbin unit has a bobbin height along the transverse axis, and
  - the coil height, the bobbin height and the magnet height are less than the mass height.

5. A transcutaneous bone-anchored hearing aid device according to claim 1,
- wherein the mass unit forms a circumference around the bobbin unit, the permanent magnet, and the coil unit, and
- wherein the permanent magnet forms a circumference around the coil unit and a part of the bobbin unit.

6. A transcutaneous bone-anchored hearing aid device according to claim 1,
- wherein the permanent magnet is arranged radially to the mass unit, and
- wherein the coil unit is arranged radially to the permanent magnet.

7. A transcutaneous bone-anchored hearing aid device according to claim 4,
- wherein the electromagnetic vibrator has a bottom surface and an upper surface,
- wherein the upper surface of the electromagnetic vibrator is partially or fully parallel to the bottom surface of the electromagnetic vibrator,
- wherein a distance between the upper surface and the bottom surface of the electromagnetic vibrator is less than the second length,
- wherein the electromagnetic vibrator comprises an interface unit configured for receiving the electrical stimulation signal, and
- wherein the interface unit is fully arranged between the upper surface and bottom surface.

8. A transcutaneous bone-anchored hearing aid device according to claim 7,
- wherein the interface unit includes a demodulator unit configured to receive and demodulate the electrical stimulation signal and to transmit the demodulated electrical stimulation signal to the coil unit,
- wherein the coil unit is configured to generate the dynamic magnetic flux based on the demodulated electrical stimulation signal.

9. A transcutaneous bone-anchored hearing aid device according to claim 7,
- wherein the electromagnetic vibrator includes a demodulator unit configured to receive and demodulate the electrical stimulation signal and to transmit the demodulated electrical stimulation signal to the coil unit,
- wherein the coil unit is configured to generate the dynamic magnetic flux based on the demodulated electrical stimulation signal,
- wherein the demodulator unit is arranged to fit in a cavity of the bobbin unit or the mass unit, or the demodulator unit is in an air-gap between the bobbin unit and the upper surface.

10. A transcutaneous bone-anchored hearing aid device according to claim 9,
- wherein the demodulator unit is wired connected to the interface unit, and
- wherein the wired connection is guided by a guiding path in the mass unit.

11. A transcutaneous bone-anchored hearing aid device according to claim 10, wherein the guiding path is a guiding hole going through the mass unit or a guiding groove applied to a surface of the mass unit.

12. A transcutaneous bone-anchored hearing aid device according to claim 1, wherein the vibrator plate includes a first plate insert configured to receive at least a part of the spring unit and/or a vibrator plate ring arranged between the spring unit and the vibrator plate.

13. A transcutaneous bone-anchored hearing aid device according to claim 1, wherein the mass unit includes a second insert configured to receive at least a part of the permanent magnet and/or at least a part of the bobbin unit.

14. A transcutaneous bone-anchored hearing aid device according to claim 1, wherein the bobbin unit and the vibrator plate are made of a soft magnetic material.

15. A transcutaneous bone-anchored hearing aid device according to claim 2, wherein the electromagnetic vibrator has a transverse axis along a first length of the electromagnetic vibrator and a longitudinal axis along a second length of the electromagnetic vibrator, wherein the second length is longer than the first length, and the transverse axis is orthogonal to the longitudinal axis, and wherein:

the mass unit has a mass height along the transverse axis, the coil unit has a coil height along the transverse axis, the permanent magnet has a magnet height along the transverse axis, the bobbin unit has a bobbin height along the transverse axis, and the coil height, the bobbin height and the magnet height are less than the mass height.

16. A transcutaneous bone-anchored hearing aid device according to claim 3, wherein the electromagnetic vibrator has a transverse axis along a first length of the electromagnetic vibrator and a longitudinal axis along a second length of the electromagnetic vibrator, wherein the second length is longer than the first length, and the transverse axis is orthogonal to the longitudinal axis, and wherein:

the mass unit has a mass height along the transverse axis, the coil unit has a coil height along the transverse axis, the permanent magnet has a magnet height along the transverse axis, the bobbin unit has a bobbin height along the transverse axis, and the coil height, the bobbin height and the magnet height are less than the mass height.

17. A transcutaneous bone-anchored hearing aid device according to claim 2, wherein the mass unit forms a circumference around the bobbin unit, the permanent magnet, and the coil unit, and wherein the permanent magnet forms a circumference around the coil unit and a part of the bobbin unit.

18. A transcutaneous bone-anchored hearing aid device according to claim 3, wherein the mass unit forms a circumference around the bobbin unit, the permanent magnet, and the coil unit, and wherein the permanent magnet forms a circumference around the coil unit and a part of the bobbin unit.

19. A transcutaneous bone-anchored hearing aid device according to claim 4, wherein the mass unit forms a circumference around the bobbin unit, the permanent magnet, and the coil unit, and wherein the permanent magnet forms a circumference around the coil unit and a part of the bobbin unit.

20. A transcutaneous bone-anchored hearing aid device for a recipient patient comprising:

a receiver coil for transcutaneous receiving of an externally generated communication signal;

a signal processor configured for converting the externally generated communication signal into an electrical stimulation signal, and an electromagnetic vibrator configured for receiving the electrical stimulation signal, the electromagnetic vibrator including a housing in which is housed:

a coil unit configured to generate a dynamic magnetic flux based on the electrical stimulation signal, a permanent magnet configured to generate a static magnetic flux, a mass unit connected to the permanent magnet, a bobbin unit configured to engage with the coil unit, the permanent magnet, and the mass unit, a spring unit configured for maintaining an air gap below a moving mass, wherein the moving mass includes the coil unit, the permanent magnet, the mass unit and the bobbin unit, and where the moving mass and the spring unit are configured to generate an acoustical vibration, a vibrator plate configured to receive the acoustical vibration, and where the air gap is between the vibrator plate and a part of the moving mass, wherein the electromagnetic vibrator includes a demodulator unit configured to receive and demodulate the electrical stimulation signal and to transmit a demodulated electrical stimulation signal to the coil unit, and wherein the demodulator unit is arranged to fit in a cavity of the bobbin unit or the mass unit, or the demodulator unit is arranged in an air-gap between the bobbin unit and an upper surface of the electromagnetic vibrator.

* * * * *